(12) United States Patent
Loriot et al.

(10) Patent No.: US 8,020,842 B2
(45) Date of Patent: Sep. 20, 2011

(54) CLAMPING OR GRIPPING TOOL COMPRISING AN AUTONOMOUS COMPENSATION SYSTEM

(76) Inventors: Jean-Marc Loriot, Paris (FR); Christian Salesse, Laroche Pres Feyt (FR)

(*) Notice: Subject to any disclaimer, the term of this patent is extended or adjusted under 35 U.S.C. 154(b) by 806 days.

(21) Appl. No.: 12/084,680

(22) PCT Filed: Nov. 3, 2006

(86) PCT No.: PCT/FR2006/002454
§ 371 (c)(1), (2), (4) Date: May 6, 2008

(87) PCT Pub. No.: WO2007/054633
PCT Pub. Date: May 18, 2007

(65) Prior Publication Data
US 2009/0224456 A1    Sep. 10, 2009

(30) Foreign Application Priority Data

Nov. 8, 2005 (FR) .................................. 05 11310
Apr. 28, 2006 (FR) .................................. 06 03820
Aug. 2, 2006 (FR) .................................. 06 07064

(51) Int. Cl.
*B25B 1/00* (2006.01)
*B25B 5/00* (2006.01)
*B25B 1/02* (2006.01)
*B23P 19/04* (2006.01)

(52) U.S. Cl. .......... 269/240; 269/249; 269/149; 29/257; 29/264

(58) Field of Classification Search ............... 269/240, 269/249, 149, 246; 29/257, 256, 264, 276
See application file for complete search history.

(56) References Cited

U.S. PATENT DOCUMENTS 1,372,833 A * 3/1921 Sauer ............................ 269/221
(Continued)

FOREIGN PATENT DOCUMENTS

FR            2 866 255 A1    8/2005
(Continued)

OTHER PUBLICATIONS

International Search Report, dated Mar. 21, 2007, corresponding to PCT/FR2006/002454.

*Primary Examiner* — Alvin Grant
(74) *Attorney, Agent, or Firm* — Christie, Parker & Hale, LLP (57) ABSTRACT

The clamping or gripping tool comprises a first member (18) and a second member which are capable of relative movement under the action of a drive system of the screw-nut type, the said nut being incapable of translational movement relative to the first member (18), and a compensation system (46) inserted between the first member (18) and a movable support (14) secured to the nut (12) to reset the position of this first member (18) with respect to the second member. The compensation system comprises a compensating disc (68) that rotates as one with a hub (50) screwed around the movable support (14), a measurement disc (80) mounted on the movable support (14) via a freewheel mechanism (76) and at least one energy-storing spring (74) inserted between the compensating disc (68) and the measurement disc (80) so that the memorizing of the degree of wear of the component parts is materialized in the relative angular position of the measurement disc (80) with respect to the movable support (14). Application in particular to welding grippers and disc-braking systems.

10 Claims, 5 Drawing Sheets

U.S. PATENT DOCUMENTS

| | | | | |
|---|---|---|---|---|
| 2,726,694 | A | * | 12/1955 | Saxton .......................... 269/218 |
| 3,072,106 | A | * | 1/1963 | Randol ........................ 91/369.4 |
| 3,072,235 | A | * | 1/1963 | Aschauer .................... 192/99 A |
| 3,448,627 | A | * | 6/1969 | Brooks .......................... 74/117 |
| 3,461,993 | A | * | 8/1969 | Brundage .................. 192/85.37 |
| 3,560,009 | A | * | 2/1971 | Renoux ......................... 279/120 |
| 3,704,879 | A | * | 12/1972 | Nishikawa ................... 269/222 |
| 4,050,549 | A | * | 9/1977 | Hori et al. .................... 188/72.8 |
| 4,258,908 | A | * | 3/1981 | Goff et al. .................... 269/239 |
| 4,276,692 | A | * | 7/1981 | Casler et al. ................... 30/347 |
| 4,663,009 | A | * | 5/1987 | Bloomquist et al. ....... 204/192.2 |
| 5,533,603 | A | * | 7/1996 | Terranova et al. ............. 192/35 |
| 5,971,378 | A | * | 10/1999 | Sweeney .......................... 269/6 |
| 6,098,772 | A | * | 8/2000 | Kimmig et al. .......... 192/70.252 |
| 6,269,926 | B1 | * | 8/2001 | Lemoine et al. ............. 192/84.6 |
| 6,311,807 | B1 | * | 11/2001 | Rinsma ........................ 188/71.9 |
| 6,386,339 | B1 | * | 5/2002 | Woollams ..................... 188/203 |
| 6,491,137 | B2 | * | 12/2002 | Lumpkin et al. ........... 188/24.15 |
| 6,588,565 | B1 | * | 7/2003 | Maucher ................. 192/70.252 |
| 6,659,236 | B1 | * | 12/2003 | Clark et al. ................ 188/79.52 |
| 7,098,419 | B2 | * | 8/2006 | Salesse et al. ............. 219/86.32 |
| 2004/0140294 | A1 | | 7/2004 | Salesse et al. |
| 2007/0221018 | A1 | * | 9/2007 | Salesse et al. .................. 81/487 |

FOREIGN PATENT DOCUMENTS

| | | |
|---|---|---|
| WO | WO 02/076665 A1 | 10/2002 |
| WO | WO 2005/077585 A1 | 8/2005 |

* cited by examiner

CLAMPING OR GRIPPING TOOL COMPRISING AN AUTONOMOUS COMPENSATION SYSTEM

CROSS-REFERENCE TO RELATED APPLICATION

This application is a National Phase Patent Application of International Application Number PCT/FR2006/002454, filed on Nov. 3, 2006, which claims priority of French Patent Application Number 0511310, filed on Nov. 8, 2005, French Patent Application Number 0603820, filed on Apr. 28, 2006, and French Patent Application Number 0607064, filed on Aug. 2, 2006.

The present invention relates to a clamping tool comprising a compensation system able to reset the position of contact parts so as to carry out in particular an adjustment or compensation for their wear.

In FR 2822401 and the corresponding application PCT/FR02/00444 the applicants have described a clamping tool that consists of an actuating device with a variable mechanical gain.

This clamping tool comprises a first member and a second member capable of a relative displacement under the action of a drive device, this device comprising a screw of a given pitch capable of being rotatably driven about an axis in one direction or in the opposite direction under the action of a motor, a nut co-operating with the screw and capable of being displaceably driven in the direction of the axis of the screw, the said nut moving translationally as one with the first member, first guide means defining a linear guidance parallel to the axis of the screw so as to prevent the rotation of the nut in a first displacement phase of the nut, and second guide means defining a helical guidance that extends along the axis of the screw and that has an opposite pitch with respect to that of the screw so as to permit the rotation of the nut in the same rotational direction as the screw in a second displacement phase of the nut.

This drive device has a variable kinematic ratio with a first displacement phase in which the nut is prevented from rotating, and a second displacement phase in which the nut is rotatably driven in the same direction as the screw, which then allows the apparent pitch of the screw and thus the displacement velocity of the nut to be reduced in this second displacement phase. Assuming that the screw turns at a constant angular velocity, the displacement velocity (linear velocity) of the nut will be greater in the first displacement phase and will decrease until it possibly becomes zero in this second displacement phase.

In the application PCT/FR05/00306 the applicants have described an improvement in the clamping tool of the aforedescribed type, which involves a compensation system arranged between the first member and a mobile support integral with the nut in order to reset the position of this first member with respect to the second member, in such a way that the first and second displacement phases produced by the first and second guide means remain synchronous with the phases necessary for an optimisation of the displacement of the first member.

This compensation system thus permits the periodic resetting or calibration of the position of the first member with respect to that of the nut, and in particular the position of the first member when the nut leaves the first guide means defining a linear guidance so as to approach the second guide means defining a helical guidance. Thus, if the nut is provided with tracking elements, such as rollers, this enables the position of the first member to be reset when the rollers leave the linear guidance in order to approach the helical guidance.

The clamping tool according to the prior art mentioned above can be realised in particular in the form of tongs, for example welding tongs, or also in the form of a disc brake system.

The invention aims to improve such a known clamping tool.

The invention aims in particular to improve the compensation system described in the application PCT/FR05/00306, which has the disadvantage that it cannot compensate a dislocation or shift occurring over time between the first and second members (in particular when these members are electrodes that are subject to progressive wear), without the addition of a second actuating system.

The object of the invention is accordingly a clamping tool comprising a first member and a second member capable of a relative displacement under the action of a drive device, this device comprising a screw of a given pitch capable of being rotatably driven about an axis in one direction or in the opposite direction under the action of a motor, a nut co-operating with the screw and capable of being displaceably driven in the direction of the axis of the screw, the said nut moving as one with the first member, first guide means defining a linear guidance parallel to the axis of the screw in order to prevent the rotation of the nut in a first movement phase of the nut, and second guide means defining a helical guidance that extends along the axis of the screw and that has an opposite pitch with respect to that of the screw in order to permit the rotation of the nut in the same rotational direction as the screw in a second displacement phase of the nut, and also a compensation system arranged between the first member and a mobile support integral with the nut in order to reset the position of this first member with respect to the second member, in such a way that the first and second displacement phases produced by the first and second guide means remain synchronous with the phases necessary for an optimisation of the displacement of the first member.

According to the invention the compensation system comprises a compensating disc rotating as one with a hub screwed around the mobile support, a measurement disc mounted on the mobile support via a freewheel mechanism, and at least one energy-storing spring arranged between the compensating disc and the measurement disc, in such a way that the memorising of the degree of wear of the parts is specified by the relative angular position of the measurement disc and mobile support. During the second displacement phase of the nut, the need to carry out a compensation for wear is determined by bringing the measurement disc into abutment with the mobile member, the compensating disc then being rotatably driven by the hub thereby compressing the spring or springs until the mobile support comes to rest.

Thus, this compensation system behaves in a completely autonomous manner without any external intervention of any sort. The system accordingly does not employ any actuating device—other than the main actuating device of the mechanism—in order to perform the compensating function, which consists in making the movement of the parts subject to wear synchronous with the two phases generated by the main clamping actuating device.

Other additional or alternative characteristic features of the invention are the following:

- The freewheel mechanism permits the rotation of the mobile support in the measurement disc only in one direction.
- The spring or springs is/are designed so as to store the energy required for the compensating operation and to release this energy when the level of constraint between the hub and the mobile support generates a resistance couple less than that produced by the spring or springs under compression, this release of energy only being able to effect the rotation of the compensating disc on account of the fact that the freewheel mechanism prevents the measurement disc rotating.

In exceptional cases, if the clearance to be compensated is too large or if the spring or springs is/are under a maximum degree of compression, then the compensating disc and the measurement disc are prevented from rotating, thereby producing a relative movement between the mobile support and the hub in order to effect a compensating phase in real time.

After the compensating phase in real time and when the level of constraint between the mobile support and the hub has reduced, the energy stored in the spring or springs before the compensating phase in real time is able to improve the said compensating phase and release all the constraints generated in the kinematics by this operation.

The invention also aims to improve the clamping tool described in FR 2822401 and in the application PCT/FR02/00444, which consists of an actuating device with a variable mechanical gain. The clamping tool described in these two publications comprises a nut which co-operates on the one hand in a reversible manner with a screw rotatably driven by a motor, and on the other hand, thanks to at least one roller loosely mounted on an axis perpendicular to that of the screw, with a bushing consisting of a cylindrical wall concentric with the screw, in which is cut at least one helical groove of variable but opposite pitch to that of the screw, and in which groove the roller rolls.

In this known clamping tool the entrainment of the screw by the motor will produce a longitudinal displacement of the nut at a variable speed depending on the pitch of the groove in which the roller rolls.

The generation of the axial force, and the fact that the screw-nut system is reversible, will lead to a transfer of force between the roller and the bushing, which will then relieve the axial constraint to which the screw is subjected. This transfer of force will be greater the smaller the pitch of the groove cut in the bushing compared to the pitch of the screw. Since the shape of the groove can have a pitch value of zero, it will be seen that the magnitude of the force between the roller and the bushing can be very high.

The object of the invention is in particular to overcome this disadvantage.

The invention aims in particular to provide a system permitting a high force transfer between the roller or rollers and the bushing, while ensuring a good reliability and a high performance and efficiency compatible with the uses of this system (actuating device for a clamping tool, electric brake system, aeronautical airfoil, etc.).

The invention proposes for this purpose that the roller has a truncated conical shape, while the corresponding contact surface of the groove is inclined with respect to the axis of the roller by a value such that the increase in velocity produced by the distance of the point of contact between the roller and the groove from the axis of the screw is wholly compensated by the increase of the diameter of the roller as a function of this same distance. A continuous and homogeneous contact between the roller and the surface of the groove is thereby ensured without producing any interfering sliding, regardless of the relative values of the thickness of the wall of the bushing, its diameter, and that of the roller.

It is advantageous to provide a plurality of coplanar rollers so that the forces that are produced on their axis by their truncated conical shape cancel out and do not produce any constraint on the screw. Thus, there may be provided two rollers arranged at 180° to one another, three rollers at 120°, and so on.

According to another characteristic of the invention, an abutment is provided in each roller enabling the axial force generated by the truncated conical shape of the roller to be absorbed.

It is also advantageous to provide between the nut and the screw a clearance that is greater than the value of the tolerance of the centring of the nut by the rollers so as to protect the screw against all hyperstatic phenomena that could constrain it.

In the following description, which is given solely by way of example, reference is made to the accompanying drawings, in which.

Figure 1:
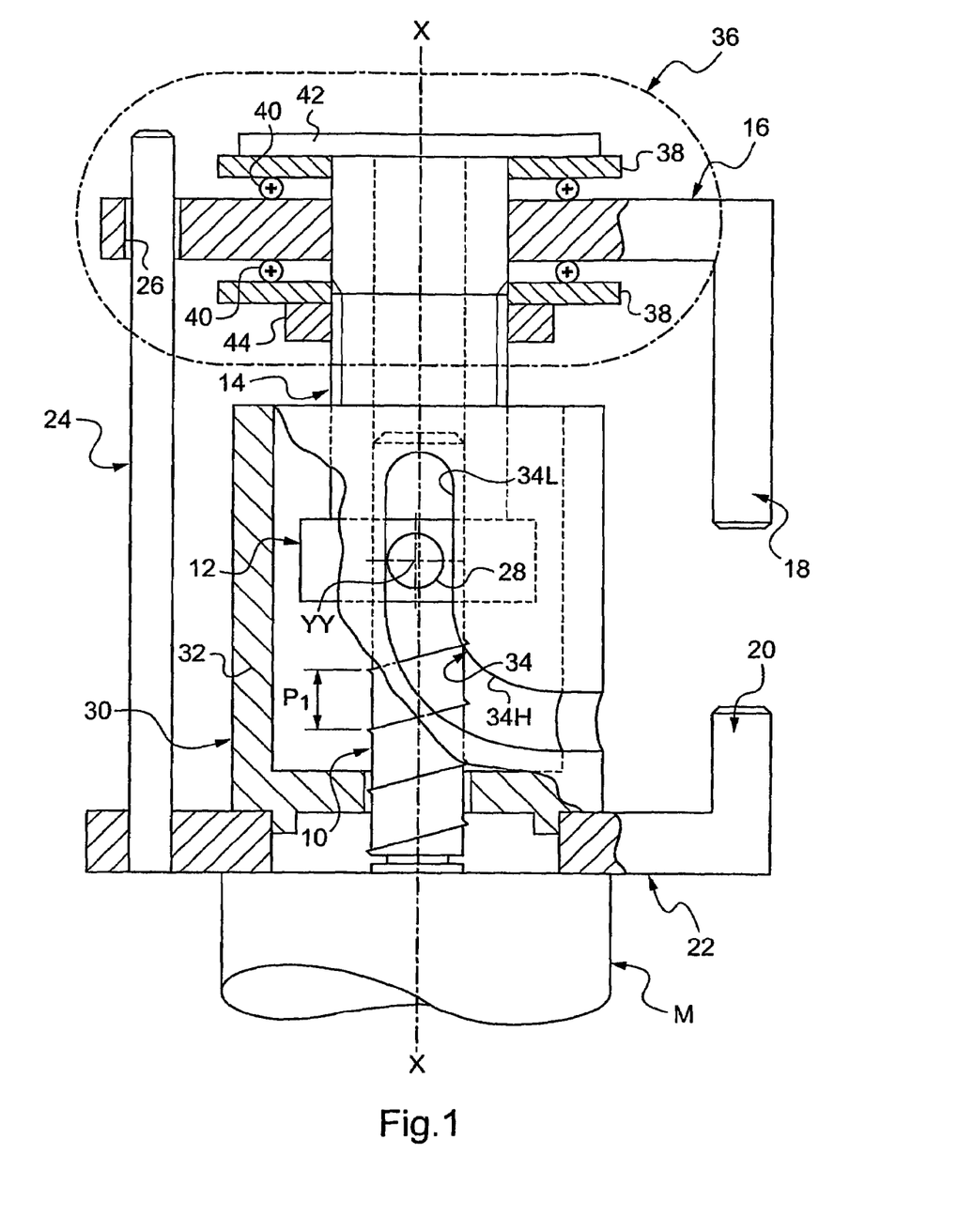
FIG. 1 is a partly sectional elevational view of a clamping tool according to the prior art.
Figure 2:
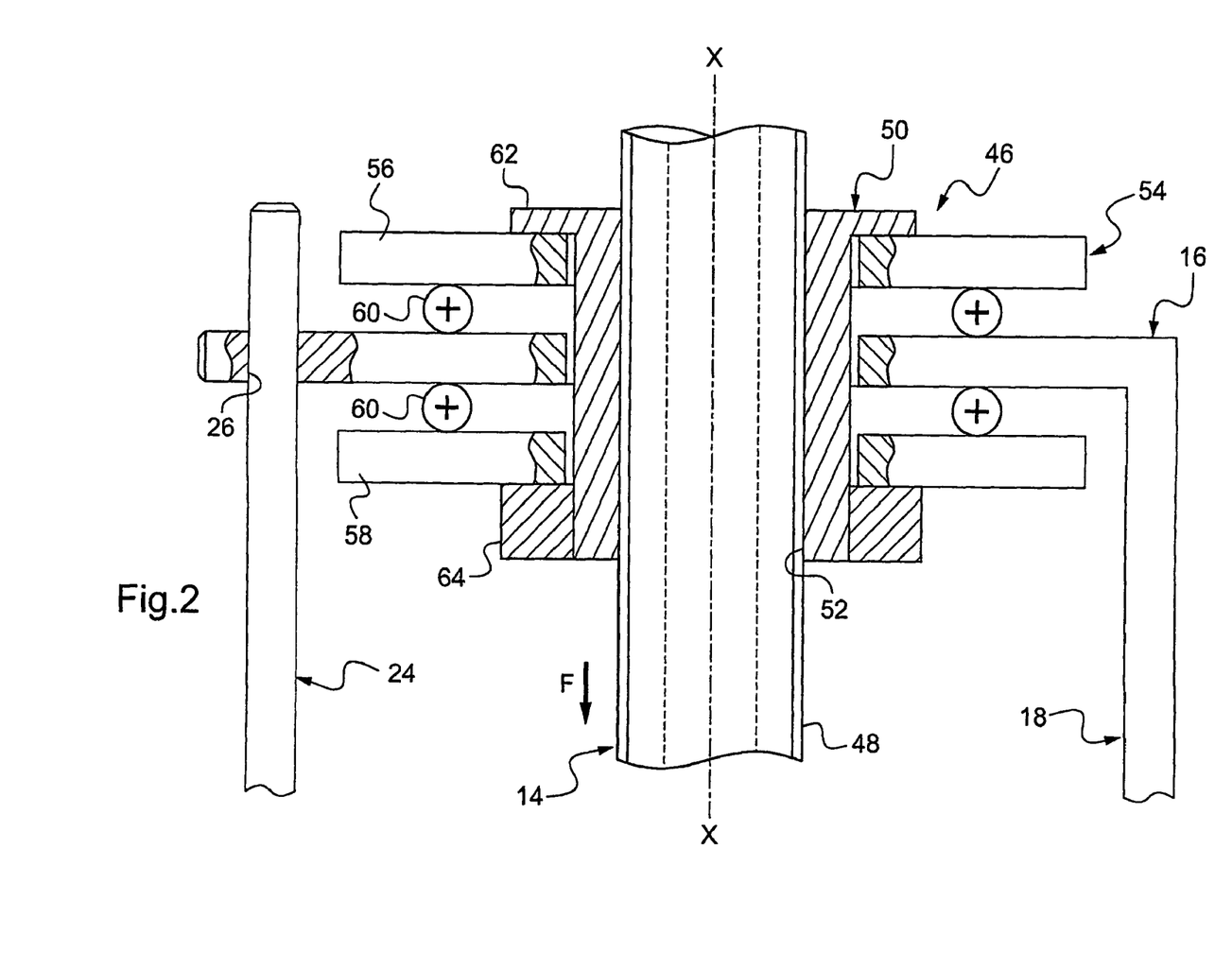
FIG. 2 shows a part of the clamping tool of FIG. 1 incorporating a compensation system according to the prior art.

Reference will first of all be made to FIGS. 1 and 2, which show a clamping tool according to the prior art and more specifically according to the application PCT/FR05/00306. The clamping tool is provided with a clamping device comprising a screw 10 capable of being rotatably driven about an axis XX by means of an electric motor M that can be coupled to a numerical control.

This screw 10 has a large pitch P1 and can be rotatably driven in one direction or the other by the motor M. The screw 10 co-operates with a nut 12 that can be rotatably driven in the direction of the axis XX of the screw. This nut is integral with a support 14, also called "mobile support", realised here in the form of a tubular element that surrounds at least in part the screw 10.

The support 14 is connected to a plate 16 that carries a first member 18 (also called "mobile member") capable of being translationally displaced, in a direction parallel to the axis XX, so as to approach or move away from a second member 20 (also called "fixed member") carried by a fixed support 22 which also carries the motor M.

A column 24 is fixed to the fixed support 22 and extends in a direction parallel to the axis XX in order to provide a translational guidance for the mobile support 14 carrying the mobile member 18. The plate 16 is provided for this purpose with an axial bore 26 through which the column 24 passes. In the specific case in which the clamping tool is a pair of welding tongs, the mobile member 18 and the fixed member 20 are respectively an electrode and a counter-electrode.

In the embodiment, the pitch P1 of the screw 10 is a right-hand pitch, the size of which is advantageously of the order of magnitude of its own diameter. The nut 12 is equipped with a pair of rollers 28 that form tracking elements and that are rotatably mounted about an axis YY that is perpendicular to the axis XX of the screw. Only one of the two rollers can be seen in FIG. 1.

The fixed support 22 carries a hollow cylindrical support 30, also called "hollow bushing", which comprises a cylindrical wall 32 in which are cut two oppositely facing slide channels 34 (only one of the two slide channels can be seen in FIG. 1). The aforementioned rollers 28 are arranged so as to roll respectively in the two slide channels 34 that form guide means.

Each of the slide channels 34 comprises a linear part 34L that extends parallel to the axis of the screw so as to provide a linear guidance for the nut 12, as well as a helical part 34H which is connected to the linear part 34L so as to provide a helical guidance. This helical part extends along the axis XX of the screw and has a pitch P2 which is opposite to the pitch P1 of the screw, and which is therefore a left-hand pitch in the example. As long as the rollers 28 are in contact with the part 34L of the slide channels, the latter prevent the nut turning; the nut can move translationally at a linear velocity imposed by the angular velocity of the motor and the pitch P1 of the screw. This constitutes a first displacement phase D1, also called stroke, which can be termed inertial phase.

On approaching the clamping point, that is to say when the rollers 28 approach the helical parts 34H, the latter cause the nut to rotate in the same direction as the rotation of the screw. As a result the linear velocity of the screw decreases until it possibly becomes zero. In fact, this is due to an apparent variation of the pitch (the linear velocity of the nut is actually synchronised to the pitch P2). It should be noted that the pitch P2 may be constant or variable. If one assumes therefore that the screw 10 is rotatably driven about its own axis at a constant specified angular velocity, the nut first of all moves (in the clamping direction) at a constant velocity for the phase D1 (inertial phase) and then at a slower velocity in the second phase D2.

In the clamping device according to the prior art the support 14 is connected to the plate 16 of the mobile member 18 by a thrust ball bearing arrangement, denoted overall by the reference numeral 36, by means of which the mobile support 14 always moves translationally as one with the mobile member 18. This thrust ball bearing arrangement 36 comprises two mating flanges 38 arranged on both sides of the plate 16 and supported on the latter via ball bearings 40. The two mating flanges 38 are held axially between a collar 42 provided at one end of the mobile support 14 and a nut 44 screwed around the other end of the mobile support 14.

The clamping device of the prior art according to FIG. 1 has the disadvantage that it cannot compensate a dislocation or misalignment occurring over time between the members 18 and 20, especially if these members are electrodes that are subject to progressive wear.

FIG. 2 enables this disadvantage to be remedied by replacing the thrust ball bearing arrangement 36 of FIG. 1 by a compensation mechanism or system that is arranged between the first member 18 and the mobile support 14 (which is integral with the nut 12) in order to reset the position of the first member 18 with respect to the second member 20, so that the first and second displacement phases D1 and D2 produced by the first and second guide means 34L and 34H remain synchronous with the phases necessary for an optimisation of the displacement of the first member 18.

In the example of FIG. 2, the compensation system 46 comprises the mobile support 14, which is realised in the form of a tubular element integral with the nut 12 and provided with an external thread 48, and it also comprises a hub 50 provided with an internal screw thread 52 for co-operation with the external thread 48 of the mobile support 14. This hub 50 supports the first member 18 by means of a thrust ball bearing arrangement 54, which is realised in the form of a double effect ball bearing arrangement comprising the plate 16 and two mating flanges 56 and 58 resting on the plate via ball bearings 60. These two mating flanges are held axially between a collar 62 formed at one end of the hub 50 and a nut 64 screwed around the other end of the hub.

The compensation system 46 enables, at intervals defined according to the service life of the clamping tool, the position of the mobile member 18 to be reset with respect to the fixed member 20, so that the different movement phases generated by the guide means of the cylindrical support 30 (hollow bushing) remain synchronous with the movement phases necessary for optimising the movement of the mobile member 18.

This compensation system permits, in particular, a relative longitudinal displacement of the member 18 in the direction of the arrow F with respect to the member 20, so as to compensate changes in their interspacing due to their wear. This is particularly useful in the case where the mobile member 18 and the fixed member 20 are respectively an electrode and a counter-electrode of welding tongs. This displacement of the mobile member 18 resulting from relative circular movement between the hub 50 and the mobile support 14 is, in the application PCT/FR05/00306, initiated by an actuating device which alternately engages the hub 50 in a locking manner with the mobile support 14 or the mobile member 18. In the French patent application 05/10911 of 26 Oct. 2005 (not published), a variant is provided by the addition of an auxiliary motor independent of the main motor of the actuating device.

In order to obviate this disadvantage, the present invention provides an autonomous compensating system that does not require any actuating system or control member other than the motorisation system of the main locking arrangement.

Figure 3:
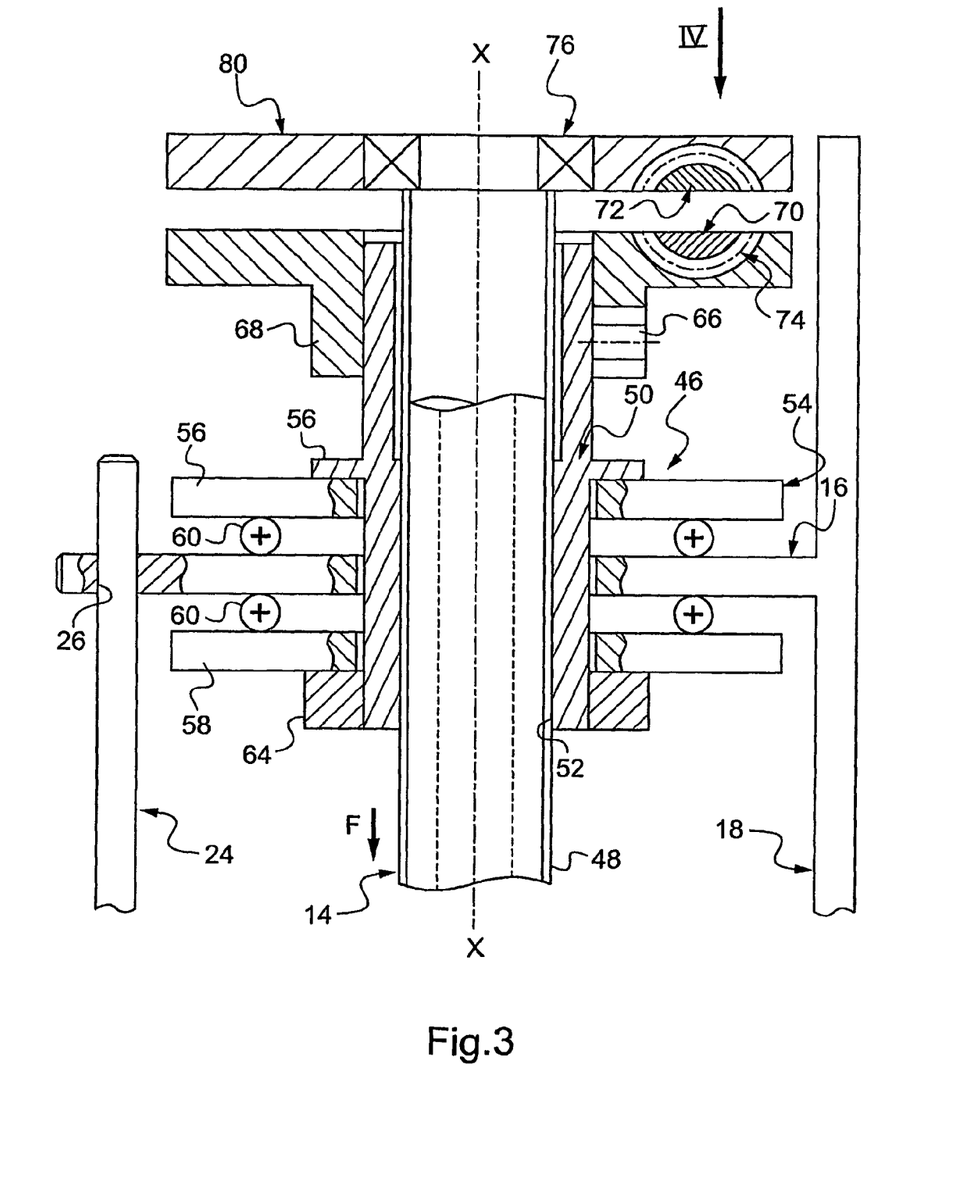
FIG. 3 is a similar view to FIG. 2, but incorporating a compensation system according to the invention.
Figures 4, 5:
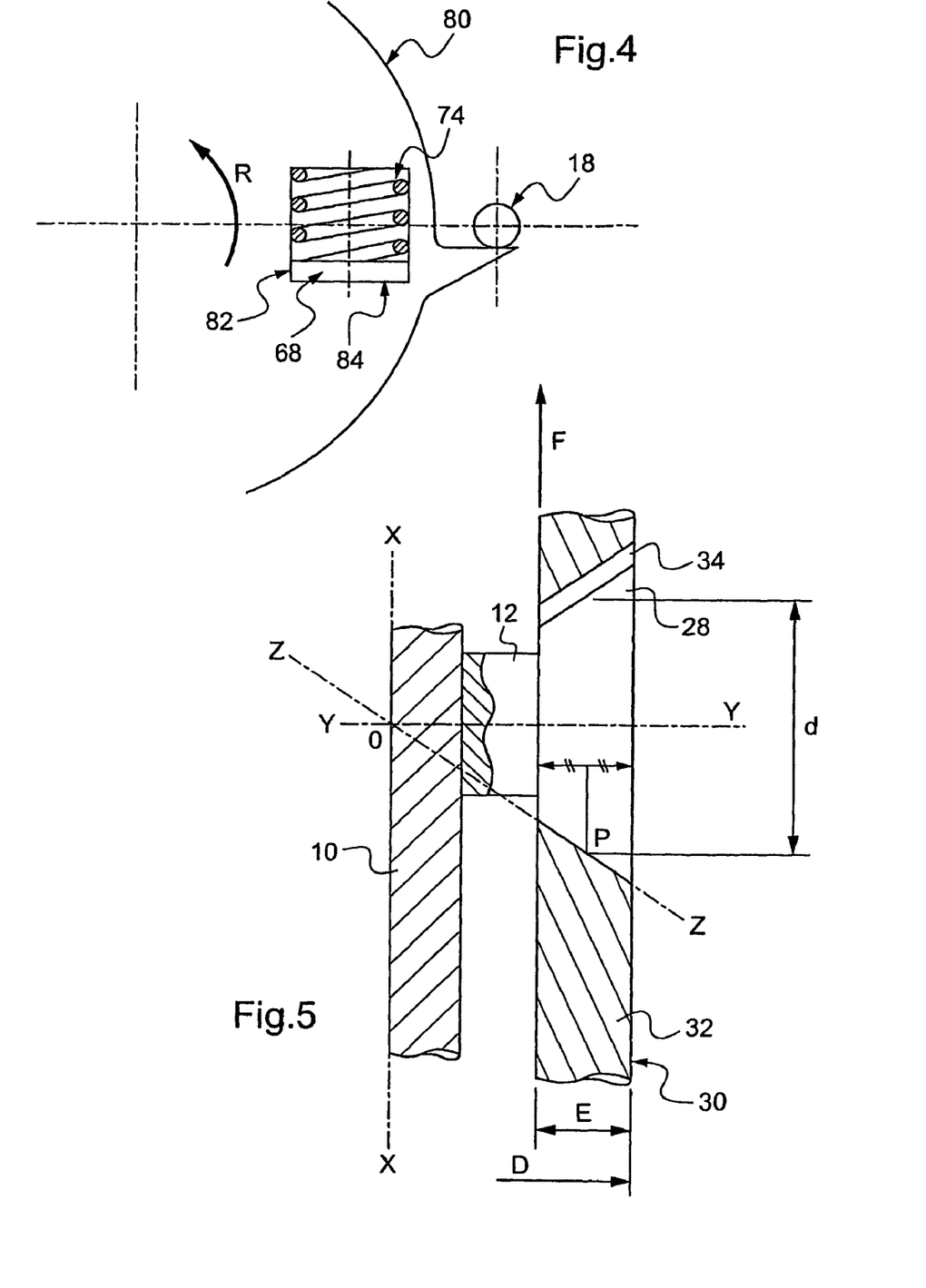
FIG. 4 is a partial view of the compensation system along the direction of the arrow IV of FIG. 3.
FIG. 5 shows a roller according to the invention.

Reference will now be made to FIGS. 3 and 4 in order to describe the compensation system according to the invention.

FIG. 3 corresponds to FIG. 2, but with the addition of a first disc 68 (or "compensating disc") rotating as one with the hub 50 by means of a finger 66, this disc thereby being able to translationally move on the said hub. The hub 50 is, as already mentioned, screwed around the mobile support 14.

A second disc 80 (or "measurement disc") is mounted on the mobile support 14 via a mechanism 76. This known mechanism (not shown) is of the "bicycle freewheel" type, which allows the mobile support 14 to rotate with respect to the disc 80 only in one direction R (FIG. 4). At least one energy-storing spring 74 is arranged between the discs 68 and 80. In the example the spring 74 is a compression spring and is accommodated in a recess or window provided in the disc 68 and in another recess provided in the disc 80.

The spring equipped with its two semi-guides 70 and 72 ensures the longitudinal position of the disc 68 with respect to the disc 80. The mobile member 18 extends as far as the disc 80, and can under certain conditions prevent the latter rotating.

FIG. 4 is a view along the arrow IV of the arrangement shown in FIG. 3 and in which there can be seen in particular the disc 80 supported on the mobile member 18 by means of a tappet present on the periphery of the disc 80. During the clamping phase (the roller 28 is in the part 34H of the groove of FIG. 1), the set of the two discs 68 and 80 will rotate in the direction of the arrow R. However, when the degree of wear of the members 18 and 20 (FIG. 1) reaches a threshold necessitating a compensation of this wear, the angle of rotation of the mobile support 14 will be such that the disc 80 will come into contact with the member 18. Now, in this clamping phase, the force transmitted by the connection of the mobile support 14 to the hub 50 is such that the friction produced on the screw thread separating these two parts causes them to engage, so that with the disc 80 at rest and the disc 68 rotating, the surface 82 of the disc 68 will thus be displaced with respect to the surface 84 of the disc 80. The spring 74 will thus be compressed and this compression will continue until the mobile support 14 no longer moves.

In other words, the memorising of the degree of wear of the component parts is specified by the relative angular position of the measurement disc 80 with respect to the mobile support 14, the measurement disc 80 being held by positive abutment on the mobile member 18, whereas the compensating disc 68 which compresses the spring or springs 74 is caused to rotate by the hub 50, which rotates as one with the mobile support 14 on account of the force transferred by the hub 50 and the mobile support 14.

It will be noted that during this phase the mechanism 76 allows the mobile support 14 to rotate in the disc 80 in the direction of the arrow R. During the unclamping phase the mobile support 14 will rotate in the opposite direction to the arrow R and in this case, thanks to the mechanism 76, will entrain the disc 80 in its movement. The spring 74 will then be able to rotate the hub 50 with respect to the mobile support 14 when the degree of constraint between these two parts becomes sufficiently small so as to permit this displacement, that is to say when the members 18 and 20 (FIG. 1) are no longer in contact, the compensating operation then taking place in this movement.

If a major loss of adjustment causes the measurement disc 80 to come into abutment with the mobile member 18 before any actual constraint occurred between the mobile support 14 and the hub 50, the disc 80 would through the spring 74 cause the hub 50 to rotate. There would therefore be a compensating phase in real time. This would cease as soon as the constraint between the hub 50 and the mobile support 14 reached a value sufficient to engage these two parts and thereby produce the compression of the spring 74 by relative displacement of the measurement disc 80 and of the compensating disc 68 then caused to rotate by the hub 50.

This deferred compensation process will become easier as the often decreasing pitch of the grooves of the support (bushing) 30 (FIG. 1) as a function of the clamping becomes at this point in time greater in value than the fixed pitch of the screw thread connecting the hub 50 to the mobile support 14 (it should be recalled that, when the compensation actually takes place, the members 18 and 20 are no longer touching).

In practice, if one considers that at the end of clamping the pitch of the grooves of the bushing has a value of the order of 1 mm, it will be useful in the majority of cases to adopt a value of this order for the pitch of the screw thread in question, though the efficiency of the compensation can lead to the adoption of higher values. The fact that the spring 74 is mounted in two recesses of the discs 68 and 80 has the advantage that this spring then operates in a state of prestress, even if it is not subjected to a force, that is to say when the surface 82 of the disc 68 and the surface 84 of the disc 80 are coplanar. In addition, this prestressing of the spring 74 ensures a long service life.

This feature enables the hysteresis phenomena of the spring and the residual friction between the hub 50 and the support 14, which affect the accuracy of the system, to be better controlled. It also enables the characteristics of the said spring to be better calculated with respect to the constraint threshold allowing or not the rotation of the hub 50 on the support 14. Finally, if it imposes an efficient guidance of the spring by the semi-guides 70 and 72, it avoids any adjustment operation, and therefore an untimely or premature maladjustment of the spring 74. In practice several springs 74 will be installed on the same equipment, and as a variant a spiral spring system can be employed between the discs 68 and 80.

This simple and completely autonomous functioning will not significantly affect the functioning of the single motor M shown in FIG. 1, and on the contrary will allow only small amplitude, and therefore frequent, compensations. In addition, the said compensations will be implemented only when the force between the members 18 and 20 reaches its maximum value. It would appear desirable in the case of vehicle brakes to systematically carry out this operation each time the vehicle stops, and specifically on the edge of the brakes under maximum force conditions. The various features of the invention will thus readily be recognised in this description, namely the memorising of the degree of wear of the component parts, which is specified by the angular position of the disc 80 with respect to the support 14, defined by the mechanism 76 (this memorising is of course combined with the longitudinal position of the hub 50). The measurement of the wear involves the storage of energy in the spring 74, which releases the energy when the level of constraint between the hub 50 and the support 14 is sufficiently low in order to permit the adjustment of the relative position of these two parts under the most accurate conditions of wear of these components and for a minimum consumption of energy.

However the invention also envisages, for obvious safety reasons, that if the gap to be compensated is very large (for example if the compensation operation has not been carried out for a long time), it will be possible on the one hand to carry out automatically via software and after an imperfect braking, a "de-braking" followed by an immediate braking (similar to the "pumping" action that vehicle drivers nowadays perform in order to prevent skidding) so as to carry out the compensation for wear that is then memorised by the rotation of the disc 80 during the first imperfect braking, and then recover the correct operating conditions, this sequence being able to be repeated, and on the other hand by means of a system (not shown in the drawing) to block the relative rotation of the disc 68 with respect to the disc 80, for example when the spring 74 has reached its state of maximum compression. This blocking of the disc 68 can be effected by an abutment operation on the member 18 offset with respect to that of the disc 80. In this case the rotation of the support 14 will directly produce a compensation phase since the disc 68, and therefore the hub 50, rotates as one. This operation should remain an exceptional procedure since, under the constraint, it leads to a serious wear of the screw thread between the hub 50 and the support 14 and an excessive loading of the motor. Finally, the energy stored in the spring 74 during the period preceding this phase will in addition accurately adjust the position of the hub 50 and of the support 14 when their connection is no longer constrained. It will dissipate all the constraints generated by this compensation operation in real time in the kinematics.

If it is assumed that this compensation operation in real time is no longer exceptional, but can be systematically implemented, the mechanism described in FIG. 3 can be considerably simplified since it is the hub 50 that can itself come directly into abutment on the member 18. It then suppresses the disc 80, the mechanism 76, the spring 74 and the disc 68. This possibility, it should be emphasised, does not appear feasible since it compromises (on account of the constraint between all the parts in relative movement with respect to one another during this compensation phase) the reliability of the system in time due to a high degree of wear of the said parts. It also considerably increases the amount of energy required for the realisation of the operation, affects the positioning accuracy, does not allow the release of the residual constraints in the overall kinematics, and finally significantly overloads the motor in terms of the power that has to be provided. It will be noted that, in the case where the clamping tool of the invention is used in a disc brake system, the position of the mechanism 76 and of the hub 50 has to be reset each time the brake pads are changed. This operation will also have to be carried out for any replacements of parts subject to wear, regardless of the application.

By way of variation, the freewheel mechanism 76 can be replaced by a clutch mechanism that engages the disc 80 and the mobile support 14 or allows them to rotate freely. In addition, the blocking of the rotation of the actual disc 80 and part 18 can itself too be activated or not according to a precise program, and no longer be systematically implemented by a positive abutment arrangement. Accordingly, the control member can program simply the resetting phase, which would include for example an "increase" of the size of the brake pads, due to an excessive heating of the mechanical arrangement.

Reference will now be made to FIG. 5, in which can be seen the screw 10 which together with the nut 12 forms a reversible system and which can be rotatably driven about its axis XX by a motor (not shown). The nut 12 carries at least one roller 28 freely rotatably mounted on its axis YY and which rests on the wall 32 that forms part of the hollow support 30, also called a hollow bushing. This wall 32 is cylindrical along the axis XX so that it is concentric with the screw 10. The roller 28 moves in a helical groove 34 of variable pitch cut in the said wall 32, the pitch being the reverse of that of the screw 10. This groove 34 forms a slide channel as defined hereinbefore in connection with FIG. 1. The rotation of the screw 10 will produce a longitudinal displacement of the nut 12 and therefore, according to the direction of rotation of the motor and the pitch of the screw 10, the generation of the force F. Since the screw-nut system 10-12 is reversible, the screw will move by following, by means of the roller 28, the pitch of the groove 34 cut in the hollow bushing 30.

Accordingly, a major part of the force F will be generated by the roller 28 resting on the bushing 30. This part of the force will be greater the smaller the pitch of the groove 34 of the bushing 30 with respect to the pitch of the screw 10. It has been seen that when the pitch of the bushing 30 is zero, an intrinsic irreversibility phase exists which frees the screw 10 from any axial force.

The object of the invention is thus to permit a force transfer between the roller 28 and the bushing 30 that is as efficient as possible. The invention thus involves choosing a shape of the roller and groove that is as efficient as possible, suppressing all undesirable sliding and ensuring perfect equality of the velocities of the parts in contact with one another, and moreover for all points of contact. The diameter of the roller 28 must therefore increase in proportion to the radius about the axis XX of the corresponding point of contact on the bushing 30.

This configuration is obtained when the contact surface between the roller 28 and the bushing 30 merges with the axis ZZ joining the meeting point O of the axes XX and YY and the point P which corresponds to the contact point between the bushing 30 and the roller 28 at the mean diameter d of the latter.

This configuration efficiently ensures an intimate contact without interfering sliding between these two parts, regardless of the values of D (diameter of the bushing 30), d (mean diameter of the rollers 28) and E (thickness of the wall 32 of the bushing 30).

Of course, the number of rollers and their arrangement (two at 180°, three at 120° and so on) will be such that this will not lead to any specific constraints on the screw on account of the axial force generated on each roller due to its truncated conical shape.

The arrangement of the rollers 28 on their respective axes will comprise an abutment so as to absorb the said axial force. This abutment is not shown in FIG. 5.

Finally, the mechanical clearance or play between the nut 12 and the screw 10 will be such that the centring produced by the rollers 28 and the bushing 30 will not lead to any constraint on the screw. In fact, the value of this clearance will be substantially greater than the accuracy of implementation of the centring of the bushing 30 and of the rollers 28, so as not to create a hyperstatic system.

In addition, this configuration, which is capable of transferring large forces or loads, is particularly useful in the case of the application of compressive forces (manual or motorised). More generally, by rationalising the transfer conditions between the rollers and the hollow support (bushing), this configuration enables the installation space of the whole of the kinematics to be reduced to a minimum for a given load.

It will be noted finally that the centring of the bushing 30 and of the truncated conical rollers 28 on the nut 12 can be a linear guidance, which is useful for the overall mobile system in certain configurations.

Figure 6:
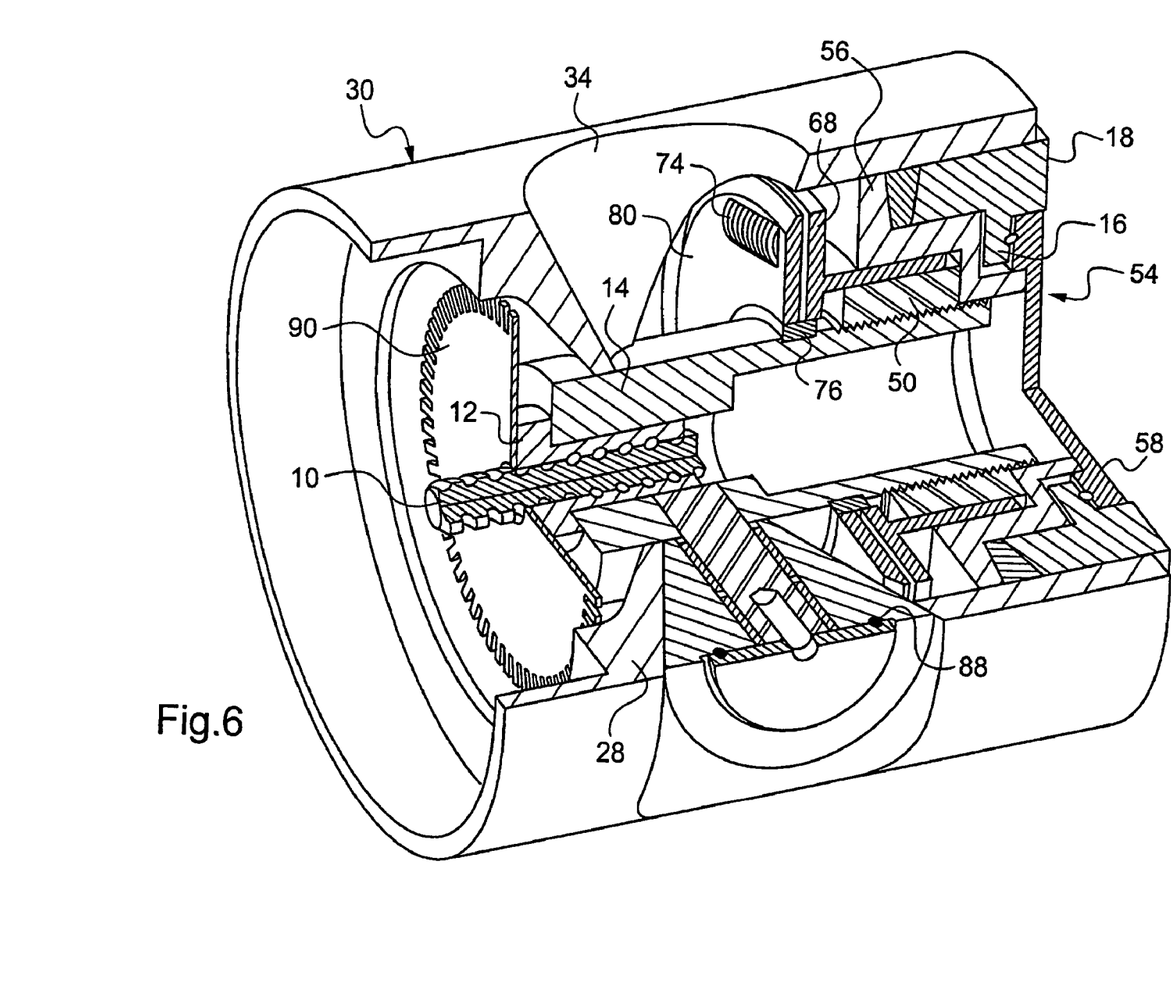
FIG. 6 is a sectional perspective view of a clamping tool according to the invention and incorporating the improved compensation system and the improved roller.

Reference will now be made to FIG. 6, which shows a clamping tool realised in the form of an electrical actuating device that is preferably used in the control of a disc brake system for vehicles.

In the figure the screw 10 can be seen, which co-operates with the nut 12 integral with the mobile support 14, the support surrounding at least in part the screw 10. The nut is provided with two rollers 28 with walls of truncated conical shape, arranged at 180°, which co-operate with respective grooves 34 of helical shape and variable pitch cut in the hollow support (hollow bushing) 30. Each of the rollers 28 comprises an abutment 88, in this case a ball bearing abutment, so as to absorb the axial force generated by the truncated conical shape of the roller.

The wear compensation system described hereinbefore will also be recognised. This system comprises a hub 50 provided with an internal screw thread for co-operation with the external thread of the mobile support 14. The hub 50 supports the first member 18 (mobile member) via a rolling abutment 54 that is realised in the form of a double effect abutment comprising the aforementioned plate 16 and the two mating flanges 56 and 58. The mobile member 18 can form an actuating piston capable of acting on a brake disc (not shown).

FIG. 6 also shows the first disc 68 (compensating disc) rotating as one with the hub 50, and the second disc 80 (measurement disc) mounted on the mobile support 14 via a freewheel type mechanism 76. At least one spring 74 of the type described hereinbefore (FIGS. 3 and 4) is mounted in a recess of the disc 68 and in a recess of the disc 80. In the example, the longitudinal position of the disc 68 with respect to the disc 80 (the disc 68 should not follow the hub 50 in its longitudinal displacement) is realised by maintaining a translational movement (not shown) of the disc 68 on the freewheel mechanism 76, and not by the guides of the spring or springs 74.

In the example under consideration, the screw 10 can be rotatably driven in one direction or the other by an electric motor (not shown), and the nut 12 is provided with a sensor 90 in the form of a disc in order to detect its angular position. The tool or actuating device is of a particularly compact design since it comprises a generally cylindrical body formed by the bushing 30. One end of the bushing 30 is arranged in the form of a collar to receive the electric motor, while its other end accommodates the mobile member 28, that is to say in this case the actuating piston of a disc brake. The screw 12 is preferably formed directly on the output shaft of the electric motor. In the case for example of large brakes whose thrust is 100 kN, the screw may have a diameter of 20 mm and a pitch of 16 mm. The sensor 90 enables the angular position of the support 14 to be measured and thus enables the degree of wear of the brake pads to be assessed with a very high degree of accuracy.

An electric brake system occupying only a small space and incorporating a particularly efficient wear compensation system is thereby obtained.

The invention claimed is:

1. Clamping tool comprising a first member (18) and a second member (20) displaced relative to each other under the action of a drive device, this device comprising a screw (10) of a given pitch (P1) capable of being rotatably driven about an axis (XX) in one direction or in the opposite direction under the action of a motor (M), a nut (12) cooperating with the screw (10) and capable of being translationally displaced in the direction of the axis (XX) of the screw, the said nut moving translationally as one with the first member (18), first guide means (34L) defining a linear guidance parallel to the axis (XX) of the screw (10) in order to prevent the rotation of the nut (12) in a first displacement phase (Dl) of the nut, and second guide means (34H) defining a helical guidance that extends along the axis (XX) of the screw (10) and which has a pitch (P2) that is opposite to the pitch (P1) of the screw in order to permit the rotation of the nut (12) in the same direction of rotation as the screw (10) in a second displacement phase (D2) of the nut (12), as well as a compensation system (46) arranged between the first member (18) and a mobile support (14) integral with the nut (12) in order to reset the position of this first member (18) with respect to the second member (20), so that the first and second displacement phases produced by the first and second guide means (34L) and (34H) remain synchronous with the phases necessary for an optimisation of the displacement of the first member, characterised in that the compensation system comprises a compensating disc (68) rotating as one with a hub (50) screwed about the mobile support (14), a measurement disc (80) mounted on the mobile support (14) by means of a freewheel mechanism (76), and at least one energy-storing spring (74) arranged between the compensating disc (68) and the measurement disc (80), so that the memorising of the degree of wear of the parts is specified by the relative angular position of the measurement disc (80) and of the mobile support (14), and in that, during the second displacement phase (D2) of the nut (12), the need to carry out a wear compensation is established by the abutment of the measurement disc (80) against the mobile member (18), the compensating disc (68) being rotatably driven by the hub (50) then compressing the spring or springs (74) until the mobile support (14) no longer moves.

2. Clamping tool according to claim 1, characterised in that the freewheel mechanism (76) permits the rotation of the mobile support (14) in the measurement disc (80) only in one direction (R).

3. Clamping tool according to claim 1, characterised in that the spring or springs (74) is/are dimensioned so as to store the energy required for the compensation operation and to release this energy when the constraint level between the hub (50) and the mobile support (14) generates a resistance couple less than that produced by the spring or springs under compression, this release of energy being able to take place only by the rotation of the compensating disc (68) on account of the fact that the freewheel mechanism (76) prevents the measurement disc (80) rotating.

4. Clamping tool according to claim 1, characterised in that, in exceptional cases, if the gap to be compensated is too large or if the spring or springs (74) has/have reached a stage of maximum compression, the compensating disc (68) and the measurement disc (80) are prevented from rotating, thereby producing a relative movement between the mobile support (14) and the hub (50) so as to effect a compensation phase in real time.

5. Clamping tool according to claim 4, characterised in that, after the compensation phase in real time and when the constraint level between the mobile support (14) and the hub (50) has decreased, the energy stored in the spring or springs (74) before the compensation phase in real time is capable of refining the said compensation phase and of dissipating all the constraints generated in the kinematics by this operation.

6. Clamping tool according to claim 1, in which the nut (12) cooperates, by means of at least one roller (28) loosely mounted on an axis (YY) perpendicular to the axis (XX) of the screw (10), with a bushing (30) consisting of a cylindrical wall (32) concentric to the screw (10) and in which is cut at least one helical groove (34) of variable but opposite pitch with respect to that of the screw, in which groove the roller (28) rolls, characterised in that the roller (28) has a truncated conical shape, while the corresponding contact surface of the groove (34) is inclined with respect to the axis (YY) of the roller (28) by a value such that the increase in velocity produced by the distance of the axis (XX) from the point of contact between the roller (28) and the cylindrical wall (32) is wholly compensated by the increase in diameter of the roller (28) as a function of this same distance, thereby ensuring a continuous and homogenous contact between the roller (28) and the surface of the groove (34), without producing any interfering sliding, regardless of the relative values of the thickness (E) of the cylindrical wall (32) of the bushing, the diameter (D) of the bushing, and the diameter (d) of the roller (28).

7. Clamping tool according to claim 6, characterised in that it comprises a plurality of coplanar rollers (28) so that the forces that are produced on their axis by their truncated conical shape cancel out and do not produce any constraint on the screw.

8. Clamping tool according to claim 7, characterised in that it comprises two rollers at 180° or three rollers at 120°.

9. Clamping tool according to claim 6, characterised in that in each roller (28) there is provided an abutment (88) enabling the axial force generated by the truncated conical shape of the roller to be absorbed.

10. Clamping tool according to claim 6, characterised in that between the screw (10) and the nut (12) there is provided a mechanical clearance greater than the value of the tolerance of the centring of the nut (12) by the rollers (28), in order to protect the screw (10) against all hyperstatic phenomena that could constrain it.

* * * * *